United States Patent
Bunn et al.

(10) Patent No.: US 8,377,384 B2
(45) Date of Patent: Feb. 19, 2013

(54) ELECTROCHEMICAL CELL ARRANGEMENT FOR THE PRODUCTION OF HYDROGEN PEROXIDE

(75) Inventors: Thomas L. Bunn, Simi Valley, CA (US); Alan Z. Ullman, Northridge, CA (US); David Stelman, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 1782 days.

(21) Appl. No.: 11/102,385

(22) Filed: Apr. 8, 2005

(65) Prior Publication Data

US 2006/0239872 A1   Oct. 26, 2006

(51) Int. Cl.
*B01J 19/08* (2006.01)
(52) U.S. Cl. .................................................. 422/186.04
(58) Field of Classification Search .................. 204/224; 422/186.04
See application file for complete search history.

(56) References Cited

U.S. PATENT DOCUMENTS

| | | | | |
|---|---|---|---|---|
| 5,227,031 A | * | 7/1993 | Sundblad | 205/510 |
| 5,702,585 A | * | 12/1997 | Hillrichs et al. | 205/468 |
| 6,004,449 A | * | 12/1999 | Vetrovec | 205/466 |
| 6,562,225 B2 | * | 5/2003 | Vetrovec | 205/466 |

FOREIGN PATENT DOCUMENTS

JP   2001-192875   *   7/2001

* cited by examiner

*Primary Examiner* — Jennifer Michener
*Assistant Examiner* — Dustin Q Dam
(74) *Attorney, Agent, or Firm* — Yee & Associates, P.C.

(57) ABSTRACT

Methods and apparatus are provided for the generation of hydrogen peroxide from an electrochemical (EC) cell arrangement. One embodiment of the apparatus comprises an EC cell having anode and cathode electrodes with a cation exchange membrane disposed between them to form anode and cathode compartments. An aqueous salt solution is supplied to the anode compartment and water and oxygen are supplied to the cathode compartment. An electric potential applied across the anode and cathode electrodes initiates an electrochemical process that results in the formation of an acid anolyte solution in the anode compartment and an alkaline catholyte solution in the cathode compartment. The anolyte solution and the catholyte solution are combined in a neutralizing chamber to form a neutral aqueous solution comprising hydrogen peroxide, salt, and water. The hydrogen peroxide is separated from the neutral aqueous solution by conventional means.

12 Claims, 3 Drawing Sheets

ELECTROCHEMICAL CELL ARRANGEMENT FOR THE PRODUCTION OF HYDROGEN PEROXIDE

TECHNICAL FIELD

The present invention generally relates to fuel regeneration for a chemical oxygen iodine laser (COIL), and more particularly relates to an electrochemical cell arrangement for the production of hydrogen peroxide.

BACKGROUND

The chemical oxygen iodine laser (COIL) is typically configured as a medium to high power laser for both industrial and military applications. A COIL laser can generally produce output power on the order of about 100 kW or less to a megawatt or more. For industrial applications, COIL lasers can be used for cutting metals and other substances. In the military arena, COIL lasers are particularly useful in missile defense, counter force, and precision strike situations where it is desirable to minimize collateral damage. COIL lasers can be mounted on spacecraft, aircraft, ships and land-based vehicles for a wide variety of military applications.

COIL lasers are conventionally fueled by reacting a basic hydrogen peroxide solution (BHP) with chlorine gas to form singlet delta oxygen ($O_2(^1\Delta)$) that reacts with iodine to produce photon emissions in the form of a laser beam. Byproducts of the conventional lasing process typically include oxygen and a spent BHP solution containing an alkali chloride salt (e.g. KCl, NaCl, LiCl) and water. These waste byproducts can be converted into reusable fuels by a fuel regeneration system to address the logistical needs of a COIL weapon system.

For certain types of military applications, e.g., ground mobile or space remote, the logistics of maintaining a COIL laser in a ready condition generally require a supply of hydrogen peroxide for the initial fuels magazine in addition to the hydrogen peroxide with potassium hydroxide typically produced by a fuel regeneration system. Industrial methods of producing hydrogen peroxide, however, are generally inappropriate for the scale and mobility of military laser weapons such as a COIL. Therefore, it is desirable to provide a more convenient means of producing hydrogen peroxide without potassium hydroxide for maintaining, generating and regenerating chemical fuels for COIL-based laser weapons. Moreover, this same technology may have commercial applications for non-military users of hydrogen peroxide.

Accordingly, it is desirable to provide a relatively simple method of producing hydrogen peroxide as an exclusive product. In addition, it is desirable to provide a method of producing hydrogen peroxide that is practical for both military and industrial applications. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for the generation of hydrogen peroxide from an electrochemical (EC) cell arrangement. One device comprises an EC cell having anode and cathode electrodes with a cation exchange membrane disposed between the anode and cathode electrodes, thereby defining an anode compartment and a cathode compartment. An aqueous salt solution is supplied to the anode compartment, and optionally to the cathode compartment, and oxygen is also supplied to the cathode compartment via a gas plenum within the EC cell. The cathode is typically in the form of a hydrophobic gas diffusion material separating the catholyte compartment and the gas plenum. An electric potential applied across the anode and cathode electrodes initiates an electrochemical process that results in the formation of an acid anolyte solution in the anode compartment and an alkaline catholyte solution in the cathode compartment. The anolyte and catholyte solutions are neutralized by mixing or ion exchange to form a neutral aqueous solution comprising hydrogen peroxide, salt, and water. The hydrogen peroxide can be separated and concentrated from the neutral aqueous solution by conventional means.

Another device comprises an EC cell having anode and cathode electrodes with an anion exchange membrane and a cation exchange membrane disposed between the anode and cathode electrodes, thereby defining an anode compartment, a central chamber, and a cathode compartment. An aqueous salt solution is supplied to the central chamber, and water is supplied to both the anode and cathode compartments, while oxygen is also supplied to the cathode compartment via a gas plenum within the EC cell. An electric potential applied across the anode and cathode electrodes initiates an electrochemical process that results in the formation of an acid anolyte solution in the anode compartment and an alkaline catholyte solution in the cathode compartment. The anolyte and catholyte solutions are neutralized by mixing or ion exchange to form a neutral aqueous solution comprising hydrogen peroxide, salt, and water. The hydrogen peroxide can be separated and concentrated from the neutral aqueous solution by conventional means.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of fuel regeneration for chemical oxygen iodine laser (COIL) systems. Conventional fuel regeneration systems generally produce hydrogen peroxide in conjunction with potassium hydroxide. However, for certain fuel generation scenarios, it is also desirable to have a convenient source of hydrogen peroxide that can supply the initial fuels magazine of a COIL system. To provide this source of hydrogen peroxide, electrochemical cell arrangements are disclosed herein that produce hydrogen peroxide as an exclusive product. The disclosed electrochemical cell arrangements typically use a brine stream (e.g., an aqueous solution of potassium sulfate) in combination with oxygen to produce a neutral aqueous solution of salt and hydrogen peroxide. The hydrogen peroxide can be recovered by conventional means, and the salt can be re-circulated into the electrochemical cell. While the application disclosed herein for the production of hydrogen peroxide is one of fueling a COIL, many other uses exist for hydrogen peroxide, and the present invention pertains equally well to these other applications. Typical examples include chemicals production, gas generation, and water purification.

Figure 1:
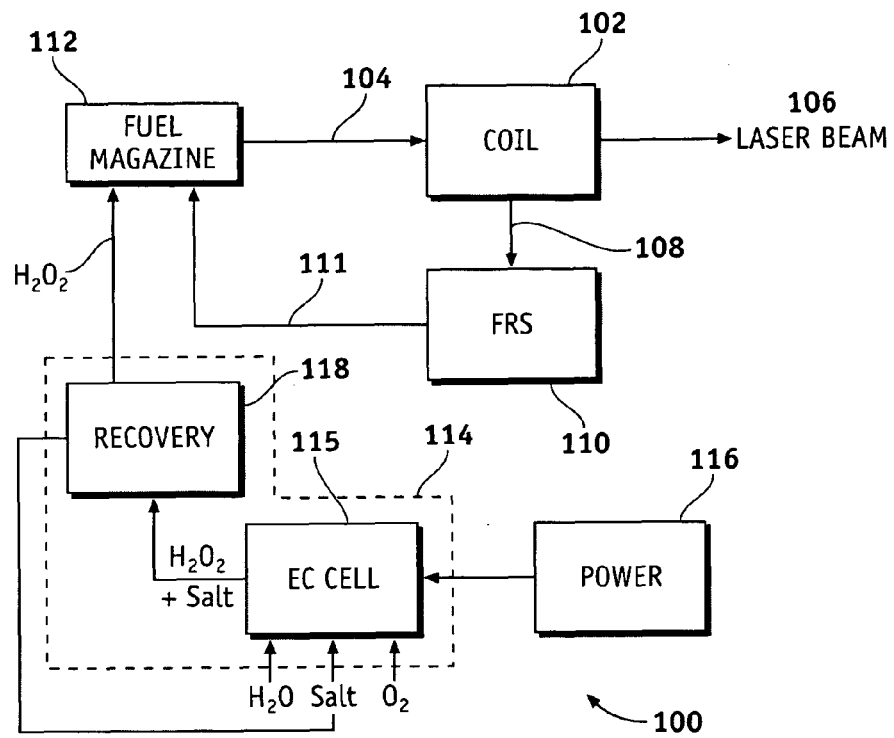
FIG. 1 is a simplified block diagram of an exemplary embodiment of a COIL system with fuel regeneration and hydrogen peroxide generation.

According to an exemplary embodiment of a COIL system 100 with fuel regeneration and hydrogen peroxide generation, as shown in the simplified block diagram of FIG. 1, a COIL 102 receives fuels 104, e.g., basic hydrogen peroxide (BHP) and chlorine ($Cl_2$), and generates an output laser beam 106. The fuel waste products 108 from COIL 102 are typically regenerated in a fuel regeneration system (FRS) 110, and the regenerated fuels 111 are generally recycled to a fuel magazine 112 that provides input fuels 104 to COIL 102.

In addition, an exemplary embodiment of an electrochemical (EC) cell arrangement 114 is configured with an EC cell 115 to receive water, oxygen, and salt in a manner to be described in subsequent sections. When an electric potential from a power source 116 is applied across the terminals (not shown) of EC cell 115, the salt is typically reacted with the water and oxygen to produce an acid anolyte and an alkaline catholyte. The acid anolyte and alkaline catholyte are then typically combined into an aqueous solution of neutral hydrogen peroxide ($H_2O_2$), salt, and water. The hydrogen peroxide is typically separated from this solution by some type of conventional recovery unit 118, and can then be provided to fuel magazine 112. The salt separated from this solution by recovery unit 118 can be recycled to EC cell 115.

Figure 2:
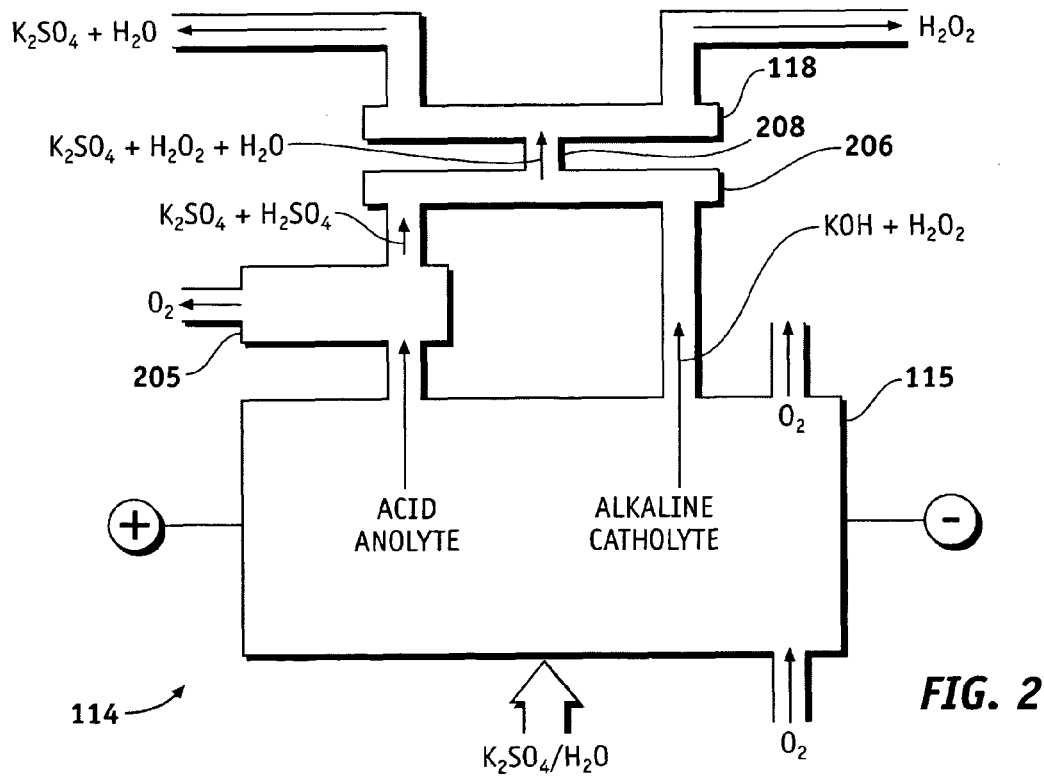
FIG. 2 is a simplified block diagram of an exemplary embodiment of an electrochemical cell arrangement to produce hydrogen peroxide.

The overall functionality of an exemplary EC cell arrangement 114 is shown in simplified form in FIG. 2. In this functional embodiment, EC cell 115 contains anode and cathode electrodes (not shown) connected across an electric potential. An aqueous solution of water and salt (e.g., potassium sulfate $K_2SO_4$) and a supply of oxygen ($O_2$) are typically introduced into appropriate compartments of EC cell 115 and are reacted into an acid anolyte and an alkaline catholyte, as will be described in more detail in conjunction with FIGS. 3 and 4. One or more ion permeable membranes are typically positioned within EC cell 115 to separate the anode and the cathode, as will also be described below in conjunction with the embodiments illustrated in FIGS. 3 and 4.

The oxygen gas ($O_2$) that is typically contained within the acid anolyte solution can be separated out by means of a suitable gas/liquid separator 205. The separated oxygen can then be released, or can be recycled to EC cell 115. The remaining acid anolyte solution (e.g., $H_2SO_4+K_2SO_4$) is typically neutralized by mixing with the alkaline catholyte solution ($KOH+H_2O_2$) in a chamber 206 to form a neutral aqueous solution comprising hydrogen peroxide, salt, and water at an outlet 208. This exemplary neutral aqueous solution (e.g., $H_2O_2+K_2SO_4+H_2O$) is typically routed to a recovery unit, such as 118 in FIG. 1, where hydrogen peroxide ($H_2O_2$) can be recovered from the solution by any suitable process (e.g., distillation), leaving an aqueous potassium sulfate solution that can be recycled into EC cell 115. As such, the stable hydrogen peroxide is available for use in the preparation and long-term maintenance of initial fuels for COIL 102 (FIG. 1).

Figure 3:
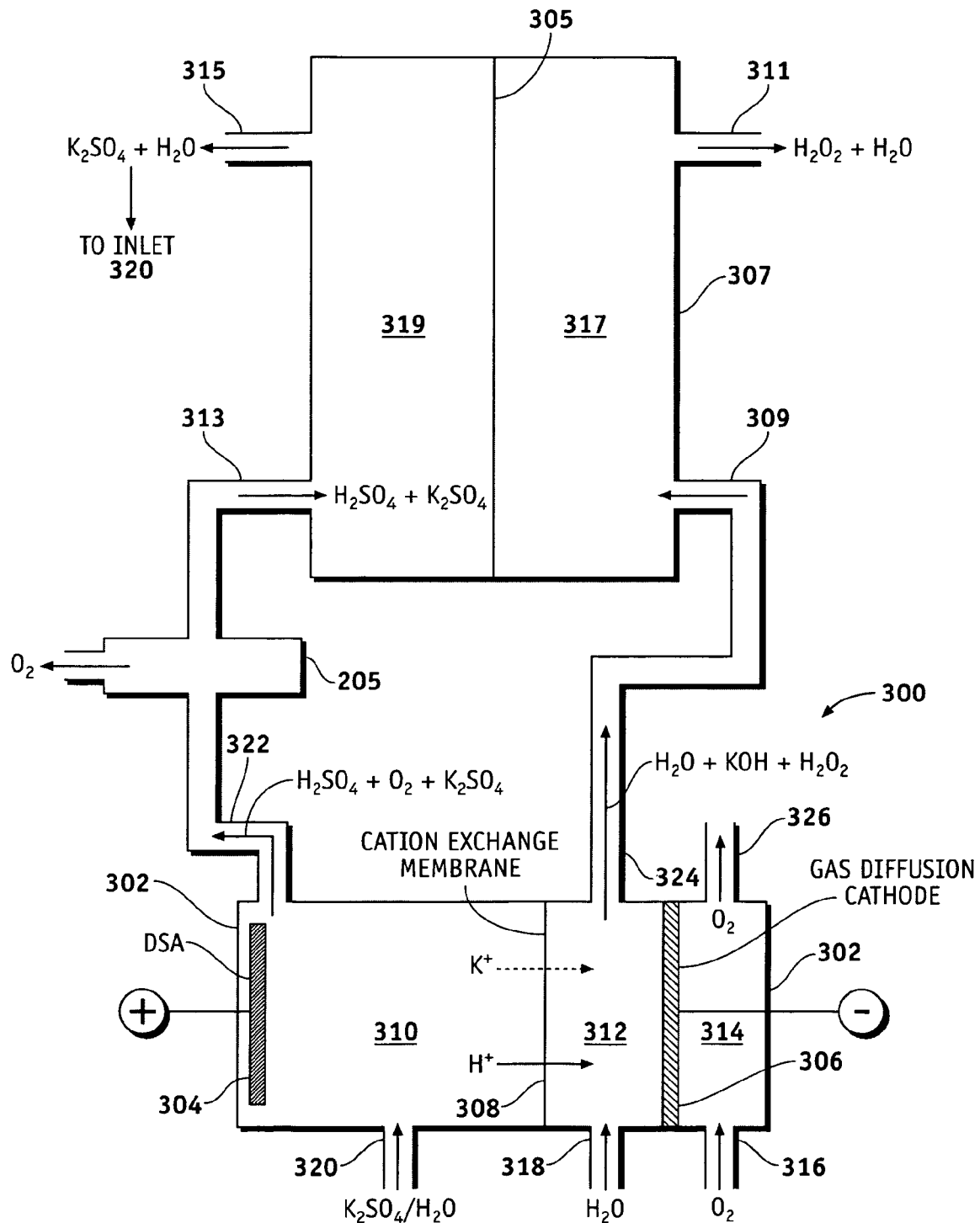
FIG. 3 is a schematic diagram of an exemplary embodiment of an electrochemical cell arrangement to produce hydrogen peroxide.

According to one exemplary embodiment of EC cell 115, designated herein as EC cell 300 in FIG. 3, a housing 302 is suitably configured to enclose an anode 304 and a cathode 306. Housing 302 also suitably encloses a cation exchange membrane 308 to form an anolyte compartment 310 between cation membrane 308 and anode 304, and a catholyte compartment 312 between cathode 306 and cation membrane 308. Housing 302 further encloses a gas plenum 314 between cathode 306 and housing 302. Gas plenum 314 is any region within housing 302 adjacent to cathode 306 that is capable of maintaining a steady flow of gas such as air or oxygen. Cathode 306 is typically a hydrophobic gas diffusion material that is configured to separate the catholyte compartment and the gas plenum. Housing 302 is any material or combination of materials that is chemically inert, resistive to acidic and basic solutions, has a low coefficient of conductivity, or does not come in contact with the electrolytes.

Anode 304 is typically a Dimensionally Stable Anode (DSA) type of electrode that is generally connected to a positive electric potential, and can be suitably formed from a titanium substrate having an iridium oxide coating. Cathode 306 is an electrode that is typically connected to a negative electric potential and is suitably formed from a low conductivity material such as, e.g., carbon papers and cloths that are capable of defining catholyte compartment 312 and gas plenum 314 within housing 302. The carbon material may be coated on the electrolyte side with a layer of high surface area sintered carbon, and with a fluorocarbon such as Teflon® on the current collector side. Although oxygen-containing gas may permeate cathode 306 from gas plenum 314 to catholyte compartment 312, liquids in catholyte compartment 312 are prevented from entering gas plenum 314 through cathode 306. Suitable gas diffusion cathodes may be obtained from various suppliers such as the E-Tek Corporation of Somerset, N.J.

Cation membrane 308 is a suitably configured ion exchange membrane that allows positively charged ions (e.g., $K^+$ and $H^+$) to pass from anolyte compartment 310 to catholyte compartment 312 while resisting hydroxide ion back migration from catholyte compartment 312 to anolyte compartment 310. One example of a commercially available cation membrane suitable for this application is the Nafion 551® manufactured by the DuPont Corporation.

EC cell 300 is suitably configured with an inlet 316 for introducing a gas (e.g., oxygen) into gas plenum 314 to be diffused through a saturated cathode 306 where the electrochemical reaction occurs. EC cell 300 is also suitably configured with an inlet 318 for introducing water ($H_2O$) into catholyte compartment 312. EC cell 300 is further suitably configured with an inlet 320 for introducing an aqueous salt solution (e.g., potassium sulfate) into anolyte compartment 310. Moreover, EC cell 300 is suitably configured with an outlet 322 from anolyte compartment 310, an outlet 324 from catholyte compartment 312, and an outlet 326 from gas plenum 314.

The chemical reaction process within this embodiment is activated by the application of an electric potential across anode 304 and cathode 306. In this exemplary embodiment, water from the aqueous salt solution supplied from an external source into anolyte compartment 310 via inlet 320 is appropriately hydrolyzed at the surface of anode 304 to form hydrogen ions and oxygen, as indicated below:

$$H_2O \rightarrow 2H^+ + \tfrac{1}{2}O_2 + 2e^-$$ 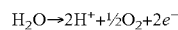 (Equation 1)

The oxygen ($O_2$) supplied from an external source into gas plenum 314 via inlet 316 is appropriately diffused through cathode 306 into catholyte compartment 312, at a rate approximately two times the stoichiometric requirement indicated by Equation 2 (below), and the remainder of the oxygen in gas plenum 314 is emitted via outlet 326. Water supplied from an external source into catholyte compartment 312 via inlet 318 is appropriately reacted with the diffused oxygen at the surface of cathode 306 in accordance with the following:

$$H_2O + O_2 + 3e^- \rightarrow OH^- + O_2H^- \quad \text{(Equation 2)}$$

Hydrogen ions ($H^+$), as well as potassium ions ($K^+$), from anolyte compartment 310 are appropriately transported across cation membrane 308 to maintain a charge balance in catholyte compartment 312 and to form hydrogen peroxide ($H_2O_2$), as indicated by the following overall reaction:

$$\tfrac{1}{2}O_2 + H_2O \rightarrow H_2O_2 \quad \text{(Equation 3)}$$

In this embodiment, the use of a salt solution such as potassium sulfate ($K_2SO_4$) enhances the electrical conductivity of the electrolytes in EC cell 300 while not interfering with the electrochemistry at anode 304 or cathode 306.

Referring again to anolyte compartment 310, the oxygen ($O_2$) evolved at anode 304 and the acid anolyte solution comprising $H_2SO_4$ and $K_2SO_4$ are emitted from EC cell 300 via outlet 322. As previously described, the oxygen is typically separated from the acid anolyte solution in gas/liquid separator 205, and can be recycled into gas plenum 314 via inlet 316. The remaining acid anolyte solution can be routed through gas/liquid separator 205 to a neutralizing chamber, such as a membrane ion exchange device 307. The alkaline catholyte solution, comprising $H_2O_2$, KOH, and $H_2O$, is emitted from EC cell 300 via outlet 324, and can also be routed to membrane ion exchange device 307.

Membrane ion exchange device 307 comprises a catholyte inlet 309 and a product outlet 311, in addition to an anolyte inlet 313 and an anolyte outlet 315. A cation exchange membrane 305 is configured to divide membrane exchange device 307 into a catholyte (base) compartment 317 and an anolyte (acid) compartment 319. In this embodiment, catholyte solution KOH, $H_2O_2$, $H_2O$ from catholyte compartment 312 enters membrane ion exchange device 307 via inlet 309, and anolyte solution $H_2SO_4$, $K_2SO_4$ from anolyte compartment 310 via gas/liquid separator 205 enters membrane ion exchange device 307 via inlet 313. In the absence of an electric potential applied to membrane ion exchange device 307, the positively charged hydrogen ions from anolyte compartment 319 are free to cross through cation exchange membrane 305 to neutralize the catholyte solution from EC cell 300. As a result, positively charged potassium ions are free to cross through cation exchange membrane 305 from catholyte compartment 317 to anolyte compartment 319 to neutralize the anolyte solution from EC cell 300.

As a result of the ion exchange reactions within membrane ion exchange device 307, an aqueous $K_2SO_4$ solution exits membrane ion exchange chamber 307 via outlet 315, and can be recycled to inlet 320 of anolyte compartment 310. The desired hydrogen peroxide product $H_2O_2 + H_2O$ exits membrane ion exchange chamber 307 via outlet 311. This hydrogen peroxide product can be further concentrated in a recovery unit (e.g., 118 in FIG. 1) by any suitable conventional method, such as crystallization, filtration, centrifugation, osmosis, evaporation and/or distillation. The recovered hydrogen peroxide can then be supplied to fuel magazine 112 (FIG. 1) for COIL 102. Also, as noted above, the separated salt can be recycled into anolyte compartment 310 in EC cell 300.

Figure 4:
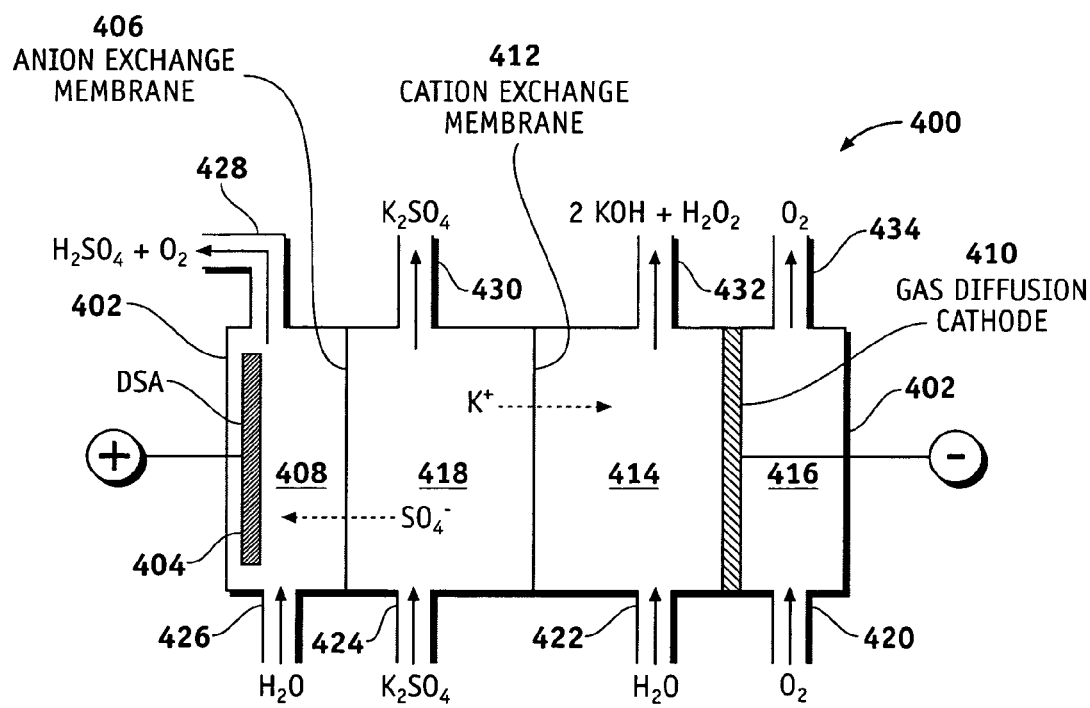
FIG. 4 is a schematic diagram of another exemplary embodiment of an electrochemical cell for the production of hydrogen peroxide.

According to another exemplary embodiment of EC cell 115, designated herein as EC cell 400 in FIG. 4, a housing 402 is suitably configured to enclose an anode 404 and an anion exchange membrane 406 to form an anolyte compartment 408 between anode 404 and anion membrane 406. Housing 402 also encloses a cathode 410 and a cation exchange membrane 412 to form a catholyte compartment 414 between cathode 410 and cation membrane 412, and housing 402 further encloses a gas plenum 416 between cathode 410 and housing 402. In addition, a central electrolyte chamber 418 is formed between anion membrane 406 and cation membrane 412. Housing 402 is any material or combination of materials that is chemically inert, resistive to acidic and basic solutions, and that has a low coefficient of conductivity, or does not come in contact with the electrolytes. This exemplary embodiment of a three-compartment electrochemical cell provides a means of preventing undesired cationic or anionic chemicals from contacting or reacting on the cathode or anode.

Anode 404 is an electrode that is typically connected to a positive electric potential and is suitably formed from a titanium substrate having an iridium oxide coating. Cathode 410 is an electrode that is typically connected to a negative electric potential and is suitably formed from a low conductivity material such as, e.g., carbon papers or cloths, that is pressed against a metal (e.g., nickel) current collector, and is capable of defining catholyte compartment 414 and gas plenum 416 within housing 402. The carbon material may be coated on the electrolyte side with a layer of high surface area sintered carbon and a fluorocarbon such as Teflon® on the current collector side. Although oxygen-containing gas may permeate cathode 410 from gas plenum 416 to catholyte compartment 414, liquids in catholyte compartment 414 are prevented from entering gas plenum 416 through cathode 410. Suitable gas diffusion cathodes may be obtained from various suppliers such as the E-Tek Corporation of Somerset, N.J.

Anion membrane 406 is a suitably configured ion exchange membrane that allows negatively-charged ions to pass from central electrolyte chamber 418 to anolyte compartment 408, and cation membrane 410 is a suitably configured ion exchange membrane that allows positively charged ions to pass from central electrolyte chamber 418 to catholyte compartment 414. One example of a commercially available anion membrane suitable for this application is the Tokuyama Neosepta ACM. An example of a commercially available cation membrane suitable for this application is the Nafion 551™ manufactured by the DuPont Corporation.

Gas plenum 416 is any region within housing 402 adjacent to cathode 410 that is capable of maintaining a steady flow of gas such as air or oxygen. EC cell 400 is suitably configured with an inlet 420 for introducing an oxygen-containing gas into gas plenum 416 to be diffused through cathode 410 into catholyte compartment 414. EC cell 400 is also suitably configured with an inlet 422 for introducing water into catholyte compartment 414. EC cell 400 is further suitably configured with an inlet 424 for introducing an aqueous salt solution (potassium sulfate in this embodiment) into central compartment 418, and EC cell 400 is also suitably configured with an inlet 426 for introducing water into anolyte compartment 408. Moreover, EC cell 400 is suitably configured with an outlet 428 from anolyte compartment 408, an outlet 430 from central chamber 418, an outlet 432 from catholyte compartment 414, and an outlet 434 from gas plenum 416. It will be appreciated that outlet 434 can be configured to recycle the gas emitted from gas plenum 416 back to inlet 420. It will also be appreciated that outlet 428 can be configured to recycle the gas emitted from anolyte compartment 408 back to inlet 420.

The chemical reaction process within the embodiment of EC cell 400 as shown in FIG. 4 is activated by the application of an electric potential across anode 404 and cathode 410. In this exemplary embodiment, the water (H$_2$O) supplied from an external source into anolyte compartment 408 via inlet 426 is appropriately hydrolyzed to form hydrogen ions and oxygen, as indicated below:

$$H_2O \rightarrow 2H^+ + \tfrac{1}{2}O_2 + 2e^- \qquad \text{(Equation 4)}$$

In central electrolyte chamber 418, the potassium sulfate solution (K$_2$SO$_4$) supplied from an external source via inlet 424 is appropriately split into negatively charged sulfate ions (SO$_4^-$) and positively charged potassium ions (K$^+$). The sulfate ions are appropriately transported across anion membrane 406 to balance the charge in anolyte compartment 408 and to form sulfuric acid (H$_2$SO$_4$). The potassium ions are appropriately transported across cation membrane 412 to maintain a charge balance in catholyte compartment 414, as described below.

The oxygen (O$_2$) supplied from an external source into gas plenum 416 via inlet 420 is appropriately diffused through cathode 410 into catholyte compartment 414. The water (H$_2$O) supplied from an external source into catholyte compartment 414 via inlet 422 combines with the diffused oxygen in catholyte compartment 414 to form an alkaline-peroxide solution in accordance with the following reaction:

$$H_2O + O_2 + 2e^- \rightarrow OH^- + O_2H^- \qquad \text{(Equation 5)}$$

The potassium ions that pass from central electrolyte chamber 418 through cation membrane 412 into catholyte compartment 414 are appropriately combined with the alkaline-peroxide solution to form a balanced catholyte solution of potassium hydroxide (2KOH) and hydrogen peroxide (H$_2$O$_2$). This balanced catholyte solution is then appropriately emitted from catholyte compartment 414 via outlet 432.

Referring again to anolyte compartment 408, the hydrolyzed oxygen (O$_2$) evolved at anode 404 and the acid solution H$_2$SO$_4$ are appropriately emitted via outlet 428. The oxygen can be separated by gas/liquid separator 205 (FIG. 2) and can either be released or can be recycled to enrich the oxygen supply to inlet 420. The anolyte solution H$_2$SO$_4$ emitted from outlet 428 can be suitably combined with the catholyte solution 2KOH/H$_2$O$_2$ emitted at output 432 in a neutralizing chamber, such as membrane ion exchange device 307, to form a neutral aqueous solution of hydrogen peroxide and salt in accordance with the following reaction:

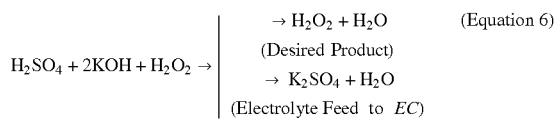
$$H_2SO_4 + 2KOH + H_2O_2 \rightarrow \begin{vmatrix} \rightarrow H_2O_2 + H_2O & \text{(Equation 6)} \\ \text{(Desired Product)} \\ \rightarrow K_2SO_4 + H_2O \\ \text{(Electrolyte Feed to } EC) \end{vmatrix}$$

The desired product from this embodiment of EC cell 400 is the neutral hydrogen peroxide (H$_2$O$_2$) resulting from the combination of anolyte and catholyte, as described above. To recover the hydrogen peroxide, the salt (K$_2$SO$_4$) and excess water (2H$_2$O) can be removed from the solution using common industrial methods, such as crystallization, filtration, centrifugation, osmosis, evaporation, and/or distillation. The recovered hydrogen peroxide can then be supplied to fuel magazine 112 (FIG. 1) as an initial fuel for COIL 102. Moreover, the separated potassium sulfate can be recycled into central electrolyte chamber 418 in EC cell 400.

The exemplary embodiments described herein are configured with a potassium sulfate salt solution to enhance the electrochemical process. However, it will be appreciated that other embodiments may use a different type of aqueous salt solution, such as sodium, lithium, nitrate, and so forth. It will also be appreciated that the electrochemistry described herein can be useful for the production of hydrogen peroxide in commercial as well as military applications. For example, hydrogen peroxide produced on-site and at low cost could offer an environmentally friendly replacement for chlorine-based bleach as an oxidizer for disinfecting applications such as the treatment of water.

Accordingly, the shortcomings of the prior art have been overcome by providing improved electrochemical cell arrangements for the production of stable hydrogen peroxide. In accordance with various embodiments, an EC cell is configured to react salt, water, and oxygen reagents to produce a neutral aqueous solution of hydrogen peroxide, salt, and water. The salt and water are separated by conventional means and the remaining hydrogen peroxide can be used, for example, as a fuel for military laser applications, or to satisfy other hydrogen peroxide applications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electrochemical cell arrangement for producing hydrogen peroxide, the electrochemical cell arrangement comprising:
    an electrochemical cell comprising an anode compartment and a cathode compartment, the anode compartment having an anode configured to hydrolyze water to produce hydrogen ions and oxygen in an anolyte solution within the anode compartment, and the cathode compartment having a cathode configured to diffuse oxygen into a catholyte solution within the cathode compartment;
    a cation membrane within the electrochemical cell, the cation membrane configured to separate the anode compartment from the cathode compartment, the cation membrane further configured to allow hydrogen and alkali cations to pass through the cation membrane from the anode compartment to the cathode compartment;
    a gas plenum within the electrochemical cell, the gas plenum configured to provide oxygen from an external source to the cathode;
    a gas/liquid separator configured to receive the anolyte solution from the anode compartment and to remove the oxygen from the anolyte solution;
    a neutralizing chamber configured to receive the anolyte solution from the gas/liquid separator, to receive the catholyte solution from the cathode compartment, to combine the anolyte solution and the catholyte solution and to output a neutral solution of hydrogen peroxide, salt and water; and
    a recovery unit configured to receive the neutral solution of hydrogen peroxide, salt and water output by the neutralizing chamber, to separate out the salt and the water from the neutral solution, and to output the hydrogen peroxide.

2. The electrochemical cell arrangement of claim 1 wherein the hydrogen peroxide is retrieved from the neutral solution by conventional means, including one or more of the following: crystallization, filtration, centrifugation, distillation, osmosis, and evaporation.

3. The electrochemical cell arrangement of claim 1 wherein the neutralizing chamber is a membrane ion exchange device.

4. The electrochemical cell arrangement of claim 1 wherein the cathode is a gas diffusion cathode.

5. The electrochemical cell arrangement of claim 1, wherein an aqueous salt solution is passed through the anode compartment of the electrochemical cell to form the anolyte solution, and wherein the aqueous salt solution comprises potassium sulfate and water.

6. The electrochemical cell arrangement of claim 1 wherein, wherein an aqueous salt solution is passed through the anode compartment of the electrochemical cell to form the anolyte solution, and the aqueous salt solution comprises sodium salt and water.

7. The electrochemical cell arrangement of claim 1, wherein an aqueous salt solution is passed through the anode compartment of the electrochemical cell to form the anolyte solution, and wherein the aqueous salt solution comprises lithium salt and water.

8. The electrochemical cell arrangement of claim 1, wherein an aqueous salt solution is passed through the anode compartment of the electrochemical cell to form the anolyte solution, and wherein the aqueous salt solution comprises nitrate salt and water.

9. The electrochemical cell arrangement of claim 1 wherein an electric potential is applied across the anode and cathode to activate the electrochemical cell.

10. A laser system, comprising:
a chemical laser configured to consume hydrogen peroxide;
an electrochemical cell comprising an anode compartment and a cathode compartment separated by a cation membrane, the anode compartment configured to receive an aqueous salt solution from an external source and to form an acid anolyte solution in the anode compartment, the cathode compartment configured to receive an aqueous solution and oxygen from external sources and to form an alkaline catholyte solution in the cathode compartment,
a gas/liquid separator configured to receive the anolyte solution from the anode compartment and to remove the oxygen from the anolyte solution;
a neutralizing chamber configured to receive the anolyte solution and the catholyte solution, to combine the anolyte solution and the catholyte solution to form a neutral aqueous solution of hydrogen peroxide, salt and water, and to output the neutral aqueous solution of hydrogen peroxide, salt and water; and
a recovery unit configured to receive the neutral aqueous solution of hydrogen peroxide, salt and water output by the neutralizing chamber, to separate out the salt and the water from the neutral aqueous solution, and to output the hydrogen peroxide, the recovery unit further configured to supply the output hydrogen peroxide to the chemical laser.

11. The laser system of claim 10 wherein the neutralizing chamber is a membrane ion exchange device.

12. The laser system of claim 11 wherein the electrochemical cell is further configured with a central chamber disposed between the anode compartment and the cathode compartment, the central chamber separated by an anion membrane from the anode compartment and by a cation membrane from the cathode compartment, the central chamber configured to receive the aqueous salt solution from an external source and to split the aqueous salt solution into anions and cations, the anions passing through the anion membrane to form an acid anolyte solution in the anode compartment, and the cations passing through the cation membrane to form an alkaline catholyte solution in the cathode compartment.

* * * * *